United States Patent
Tweed et al.

(10) Patent No.: US 7,295,567 B2
(45) Date of Patent: Nov. 13, 2007

(54) AUDIO SIGNAL RATE ADAPTATION METHOD AND SYSTEM

(75) Inventors: David B. Tweed, Chelmsford, MA (US); Alan P. Keane, Dracut, MA (US)

(73) Assignee: Harris Corporation, Melbourne, FL (US)

( * ) Notice: Subject to any disclaimer, the term of this patent is extended or adjusted under 35 U.S.C. 154(b) by 1057 days.

(21) Appl. No.: 10/408,060

(22) Filed: Apr. 4, 2003

(65) Prior Publication Data

US 2003/0219032 A1    Nov. 27, 2003

Related U.S. Application Data

(60) Provisional application No. 60/370,286, filed on Apr. 5, 2002.

(51) Int. Cl.
*H04B 7/212* (2006.01)

(52) U.S. Cl. .................. 370/429; 370/442; 704/500

(58) Field of Classification Search ........... 370/394, 370/395.61, 230–232, 428, 424, 412, 413, 370/535, 336, 337, 347, 442, 429; 704/206, 704/201, 500
See application file for complete search history.

(56) References Cited

U.S. PATENT DOCUMENTS

| | | | |
|---|---|---|---|
| 5,432,511 A | 7/1995 | Sadjadian et al. ............ 341/61 |
| 5,892,535 A | 4/1999 | Allen .......................... 725/36 |
| 6,041,295 A * | 3/2000 | Hinderks .................... 704/206 |
| 6,088,360 A * | 7/2000 | Amaral et al. .............. 370/412 |
| 6,092,126 A | 7/2000 | Rossum ....................... 710/52 |
| 6,252,919 B1 | 6/2001 | Lin ............................ 375/377 |
| 6,279,058 B1 | 8/2001 | Gulick ........................ 710/58 |
| 6,577,631 B1 * | 6/2003 | Keenan et al. ............. 370/394 |
| 2004/0246977 A1 * | 12/2004 | Dove et al. ............ 370/395.61 |

* cited by examiner

*Primary Examiner*—John Pezzlo
(74) *Attorney, Agent, or Firm*—Greenberg Traurig, LLP; David J. Dykeman

(57) ABSTRACT

A system for adapting a transmission rate of an audio signal transmitted over a TDM communications link from a source to a destination includes a first variable-depth storage component and a first processor at the source, and a second variable-length storage component and a second processor at the destination. The first storage component stores the audio signal, and the first processor selectively withdraws the signal from the first storage component. The first processor encapsulates the signal into packets and transmits the packets via the TDM link. The second processor receives the packets, removes the audio signal, and deposits the signal into the second variable-depth storage component. The first processor selectively withdraws the audio signal as a function of the amount of data in the first storage component, and the second processor selectively withdraws the audio signal as a function of an amount of data in the second storage component.

18 Claims, 2 Drawing Sheets

US 7,295,567 B2

AUDIO SIGNAL RATE ADAPTATION METHOD AND SYSTEM

CROSS-REFERENCE TO RELATED APPLICATIONS

This application is related to the following U.S. applications, of common assignee, from which priority is claimed, and the contents of which are incorporated herein in their entirety by reference:

"Audio Signal Rate Adaptation Method And System," U.S. Provisional Patent Application Ser. No. 60/370,286, filed Apr. 5, 2002.

STATEMENT REGARDING FEDERALLY SPONSORED RESEARCH

Not Applicable

REFERENCE TO MICROFICHE APPENDIX

Not Applicable

BACKGROUND

The professional quality (i.e., program) audio that is produced in a studio for a commercial radio broadcast must often be relayed to a remote transmitter site for over-the-air transmission. One technique known in the art for relaying such program audio over significant distances is to sample the audio to produce a digital data stream, then transmit the digital data on a TDM link such as a T1 or E1 digital circuit in the Public Switched Telephone Network (PSTN), Microwave links and other media. In order to preserve the integrity of the program audio, the sampled data is often transmitted in a linear range, i.e., not compressed in any way.

A common format for the digital audio data is the Audio Engineering Society/European Broadcast Union (AES/EBU) digital audio standard. AES/EBU is a bit-serial communications protocol for transmitting digital audio data through a single transmission line. This standard allows for two channels of audio data, up to 24 bits per sample, channel status bits for communication control and status information, and some error detection capabilities. Clocking information (i.e., sample rate), embedded in the AES/EBU bit stream, is recovered at the receiving end of the transmission path. The AES/EBU standard specifies the use of 32 kHz, 44.1 kHz, or 48 kHz sample rates.

FIG. 1 shows a prior art system for transmitting program audio in AES/EBU format from a studio site 12 to a remote transmitter site 14. A receive buffer 16 receives the AES/EBU data from the production source, the recovered clock and data are then provided to an asynchronous sample rate converter (ASRC) 18. The ASRC 18 converts the timing of the input AES/EBU data to conform to the TDM backplane clock associated with the studio multiplexor. The ASRC provides the data to the CPU 20 timed to the backplane clock. The PLL 24 derives the ASRC output clock, as well as the clock to the CPU 20, from the TDM backplane clock. The CPU 20 processes the AES/EBU audio data and passes this audio data to a common module (CM) 22, which implements (among other things) the T1 TDM functionality at the studio site 12. The CM 22 encapsulates the AES/EBU audio data into the T1 TDM link destined for the remote transmitter site 14.

A second CM 26 at the remote transmitter site 14 receives the T1 data from the studio site 12, extracts the timing from the T1 signal and the AES/EBU audio data from the T1 time slots, and passes the AES/EBU data to the CPU 28. The PLL 32 provides a clock to the CPU 28 that is synchronized to the TDM backplane clock. The CPU 28, after suitable processing, provides the AES/EBU data to a transmit buffer 30, which conditions and drives the AES/EBU audio to the appropriate destination within the transmitter site 14.

In the system of FIG. 1, all components after the ASRC 18 in the transmission path are synchronized to the TDM clock, so the audio data transfer from the studio site 12 to the transmitter site 14 occurs at a fairly constant rate. The ASRC 18, however, while ensuring a relatively smooth data transfer, can deteriorate the quality of the audio being transferred. For example, the ASRC FIR filter is a sharp-cutoff low-pass filter, which can produce "ringing" in waveforms that contain fast transitions. This can cause the peak FM deviation to be exceeded. Further, the finite arithmetic representation of the samples within the FIR algorithm requires one or more requantization steps, which introduce additional noise into the system. The additional hardware necessary to implement the ASRC 18 adds to the overall cost of the system. The program audio is typically relayed to the transmitter in a linear range, i.e., without compression, to avoid similar deterioration in the audio quality. It is therefore undesirable to have the ASRC 18 in the data path.

SUMMARY OF THE INVENTION

The foregoing and other objects are achieved by the invention which in one aspect comprises a system for adapting a transmission rate of an audio signal transmitted over a time division multiplexed communications link from a source to a destination. The system includes a first variable-depth storage component for receiving and temporarily storing the audio signal. The system also includes a first processor for selectively withdrawing the audio signal from the first variable-depth storage component, for encapsulating the audio signal into packets compatible with the time division multiplexed communication link, and for transmitting the packets over the time division multiplexed communications link. Also included in the system is a second processor for receiving the packets from the time division multiplexed communications link, for removing the audio signal from the encapsulating packets, and for depositing the audio signal into a second variable-depth storage component. The first processor selectively withdraws the audio signal as a predetermined function of an amount of data in the first variable-depth storage component, and the second processor selectively withdraws the audio signal as a predetermined function of an amount of data in the second variable-depth storage component.

In another embodiment, the first variable-depth storage component includes a FIFO. In yet another embodiment, the second variable-depth storage component includes a FIFO.

In another embodiment, the audio signal includes an AES/EBU digital audio signal.

In another embodiment the first processor internally implements the first variable-depth storage component, and the second processor internally implements the second variable-depth storage component.

In another embodiment, the second processor is clocked by a clocking signal derived from a signal source having a frequency that is variable according to a control signal from the second processor. The second processor monitors the second variable-length storage component and adjusts the control signal so as to maintain the second variable-depth storage component approximately half full. In one embodiment, the signal source includes a PLL. Yet another embodiment further includes a signal conditioner for receiving a signal from the signal source and producing a clocking signal therefrom. In another embodiment, the signal conditioner is implemented with a FPGA device.

In another embodiment, the first processor being clocked by a clocking signal derived from a signal source having a frequency which is variable according to a control signal derived from the time division multiplexed communications link.

Another aspect of the invention comprises a method of adapting a transmission rate of an audio signal transmitted over a time division multiplexed communications link from a source to a destination. The method includes encapsulating the audio signal within the time division multiplexed communications link. The method further includes unpacking the audio signal from the encapsulation within the time division multiplexed communications link, and varying the transmission rate of the audio signal at the destination, after unpacking from the time division multiplexed communications link.

Another aspect of the invention comprises a method of adapting a transmission rate of an audio signal transmitted over a time division multiplexed communications link from a source to a destination, including receiving and temporarily storing the audio signal in a first variable-depth storage component. The method further includes selectively withdrawing the audio signal from the first variable-depth storage component as a predetermined function of an amount of data in the first variable-depth storage component, and encapsulating the audio signal into packets compatible with the time division multiplexed communication link. The encapsulated audio signal is then transmitted via the packets over the time division multiplexed communications link. The method also includes receiving the packets from the time division multiplexed communications link, and removing the audio signal from the encapsulating packets. The extracted audio signal is deposited into a second variable-depth storage component, and the audio signal is selectively withdrawn as a predetermined function of an amount of data in the second variable-depth storage component.

Another embodiment further includes implementing the first variable-depth storage component with a FIFO. Another embodiment further includes implementing the second variable-depth storage component with a FIFO.

One embodiment further includes adapting the audio signal includes as an AES/EBU digital audio signal.

Yet another embodiment further includes implementing the first variable-depth storage component and the second variable-depth storage component in code, running on one or more processors.

Another aspect of the invention comprises a system for adapting a transmission rate of an audio signal transmitted over a time division multiplexed communications link from a source to a destination. The system includes an encapsulator, including a first variable-depth storage component for receiving and temporarily storing the audio signal. The encapsulator (i) selectively withdraws the audio signal from the first variable-depth storage component, (ii) encapsulates the audio signal into packets compatible with the time division multiplexed communication link, and (iii) transmits the packets over the time division multiplexed communications link. The system also includes an extractor for receiving the packets from the time division multiplexed communications link, for removing the audio signal from the encapsulating packets, and for depositing the audio signal into a second variable-depth storage component. The encapsulator selectively withdraws the audio signal as a predetermined function of an amount of data in the first variable-depth storage component, and the extractor selectively withdraws the audio signal as a predetermined function of an amount of data in the second variable-depth storage component.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
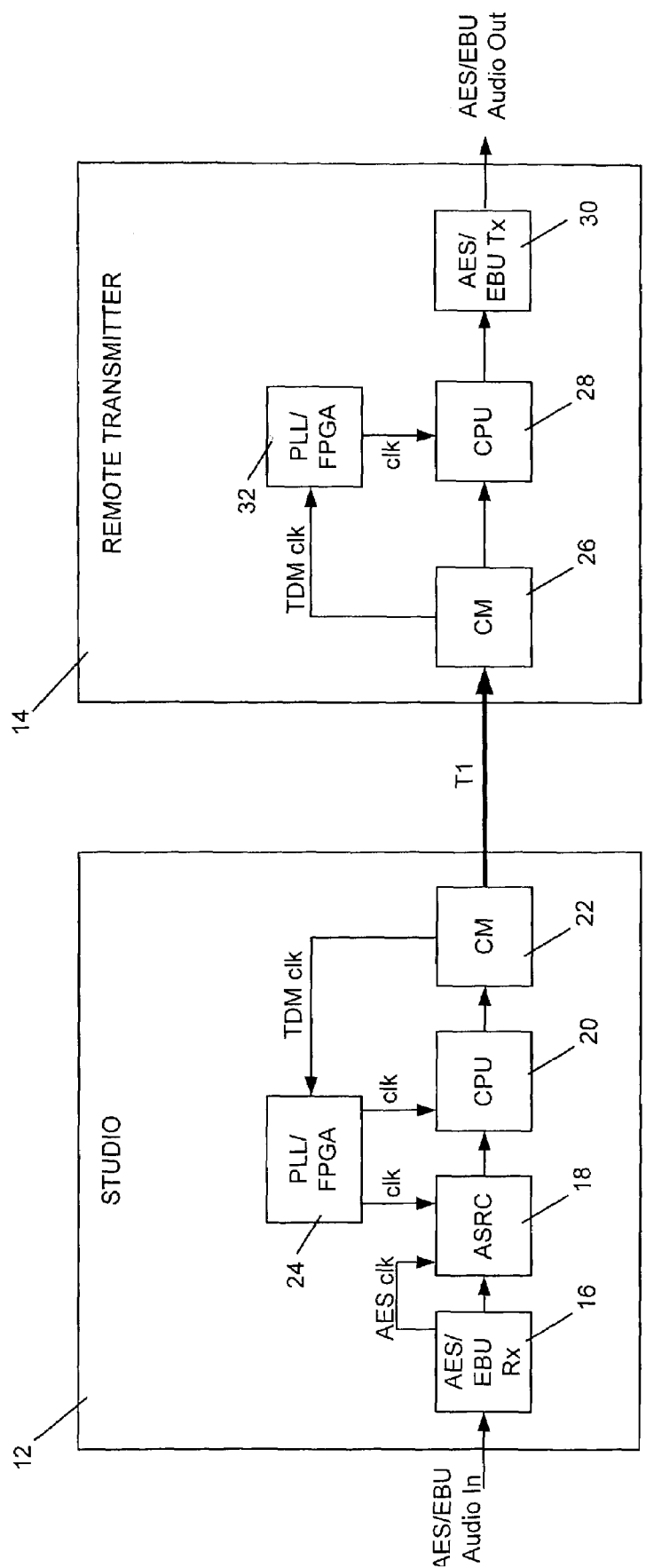
FIG. 1 shows a prior art system for transmitting program audio in AES/EBU format from a studio site to a remote transmitter site; and, FIG. 2 shows one embodiment of a system for adapting the audio signal rate in a TDM communications system.
Figure 2:
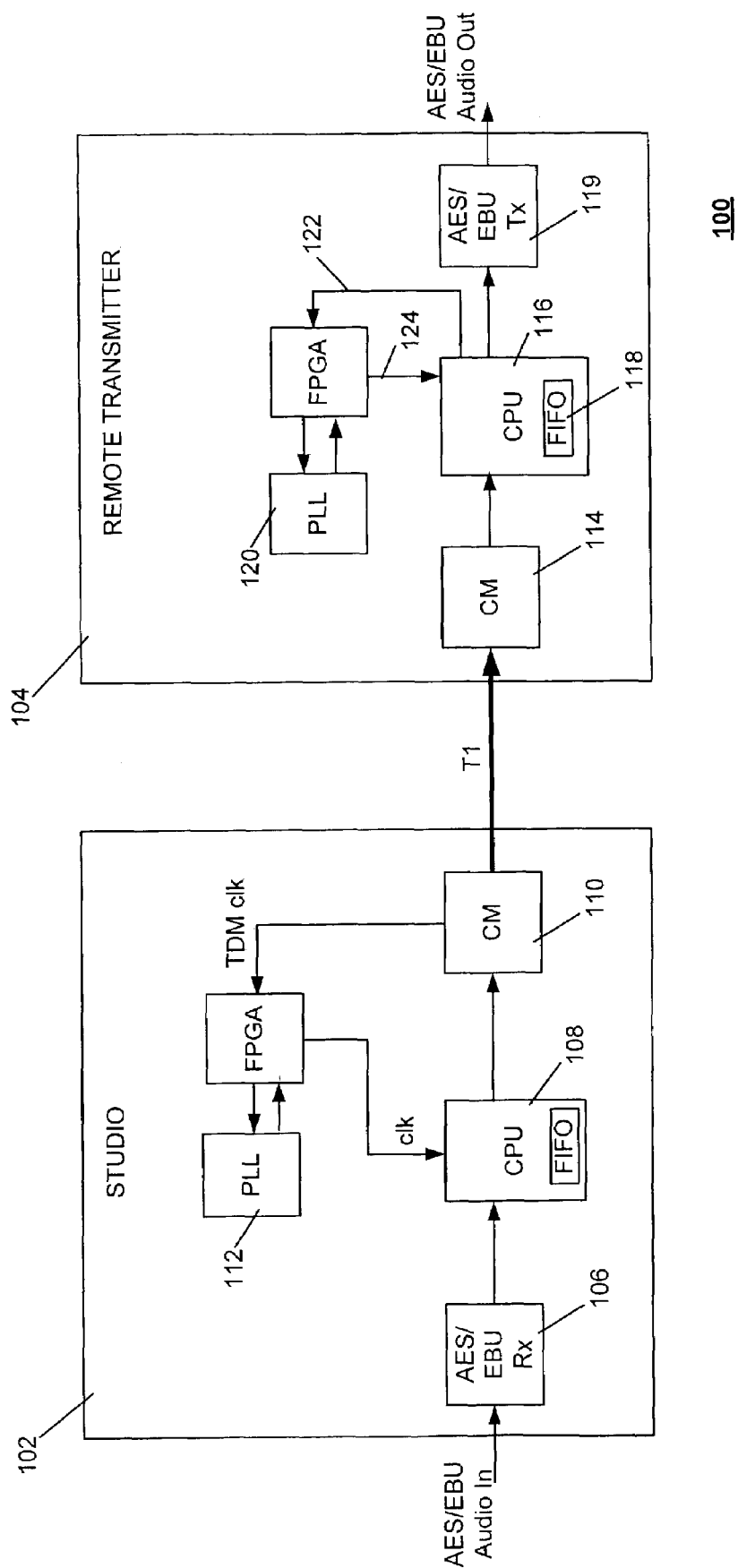

FIG. 2 shows one embodiment of a system 100 for adapting the audio signal rate in a TDM communications system. The system 100 relays program audio in AES/EBU format from a studio site 102 to a remote transmitter site 104. In general, the system 100 encapsulates the asynchronous AES/EBU audio data into a T1 TDM transmission without sample rate conversion, but performs any necessary rate adaptation at the studio site 102 before being transmitted and at the remote transmitter site 104, after the audio data has been extracted from the TDM transmission. The system 100 employs an "encapsulator" (i.e., a system or apparatus for encapsulating audio into a TDM transmission) at or near the studio site (i.e., the source), and an "extractor" (i.e., a system or apparatus for extracting the audio from a TDM transmission) at or near the remote transmitter site (i.e., the destination). FIG. 2 shows one embodiment of the encapsulator and extractor, although other embodiment may also be used.

A receive buffer 106 receives the AES/EBU data from the production source, conditions then provides the audio data to a CPU 108. The CPU 108 receives a clock from a PLL 112. The PLL 112 derives the clock to the CPU 108 and the PLL 112 is controlled from the internal FIFO depth in the CPU 108. The FIFO depth represents the amount of incoming AES/EBU data from the AES/EBU receiver 106. In one embodiment of the system 100, the CPU 108 uses the clock recovered from the input AES/EBU data stream to receive the AES/EBU data. In other embodiments, the CPU 108 handles the AES/EBU data with a derivative of the PLL clock 112. The CPU 108 processes the AES/EBU audio data and passes this audio data to a common module (CM) 110, which implements (among other things) the T1 TDM functionality at the studio site 102. The CM 110 encapsulates the AES/EBU audio data into the T1 TDM link destined for the remote transmitter site 104. One of the processing functions of the CPU 108 is to packetize the data into a superframe per the various transmission formats that are supported by the system 100. A frame packer in the CPU 108 formats the data from the audio FIFO 109 into the 8-kHz frames required by the T1/E1. The CPU 108 also determines how many time slots, per unit time, should be filled in the T1 TDM transmission. Since the incoming AES/EBU audio data is asynchronous with respect to the T1 transmission, the number of AES/EBU audio data filled per unit time in the T1 transmission cannot remain constant. The CPU 108 therefore controls the amount of audio data and auxiliary data that is sent in the required number of timeslots used in each T1 transmission.

A second CM 114 at the remote transmitter site 104 receives the T1 data from the studio site 102, extracts the AES/EBU audio data from the T1 time slots, and passes the AES/EBU data to the CPU 116 via the TDM bus timing. The CM 114 module from the T1 input extracts this TDM timing. A framer algorithm in the CPU 116 synchronizes itself to the superframe structure of the data packet by looking for the incrementing 4-bit pattern that exists in the first byte of each superframe to establish the frame boundaries. The frame unpacker then separates the auxiliary data packets from the audio samples, and the audio samples are sent to the audio FIFO 118 in the CPU 116.

In one embodiment, the CPU 116 works in conjunction with a FIFO 118 to process the AES/EBU data from the CM 114. The AES/EBU audio data from the CM 114 is clocked into the FIFO 118 with the TDM bus clock. The AES/EBU data is clocked out of the CPU 114 with the clock 124 derived by the PLL 120. The CPU 116 monitors the FIFO 118 and dynamically varies the control signal 122 to the PLL 120 so as to maintain the FIFO 118 at approximately half full. In operation, when the CPU 116 detects that the FIFO 118 is greater than half full, the CPU adjusts the control signal 122 so as to increase the frequency of the first clock 124, thus increasing the rate at which the FIFO 118 is emptied. When the CPU 116 detects that the FIFO 118 is less than half full, the CPU 116 adjusts the control signal 122 so as to decrease the frequency of the first clock 124, thus decreasing the rate at which the FIFO 118 is emptied. In a way, the PLL 120 that produces the first clock 124 is locked to the half full flag of the FIFO 118, which is indirectly related to the original AES/EBU timing at the input of the studio 102. Thus, the PLL 120 is essentially locked to the original AES/EBU timing at the studio 102.

The CPU 116 provides the AES/EBU data that has been removed from the FIFO 118 to an AES/EBU transmitter 119, which conditions and drives the AES/EBU audio to the appropriate destination within the transmitter site 104.

A related system is described in U.S. Pat. No. 5,818,769, entitled Dynamically Variable Digital Delay Line, and is incorporated by reference herein in its entirety. The '769 patent describes an elastic digital delay line that implements the elasticity by varying the output rate of the delay line. A PLL controls the output rate of the delay line as a function of a control signal tied to the desired amount of delay, similar to the present invention that controls the output rate of the FIFO 118 as a function of the amount of data in the FIFO 118. Many of the same techniques taught in the '769 patent may also be used to implement various embodiments of the present invention. For example, the '769 patent teaches first adjusting the PLL according to a course resolution, and then refining the adjustment according to a fine resolution. The system 100 may also initially adjust the PLL 120 according to a coarse resolution, and then revert to a fine resolution to refine the adjustment.

An advantage of the system 100 described herein (and of the inventive concepts embodied in the system 100) is that at the data destination, the receiver does not need to synchronize with the media that transported the audio data. The receiver can therefore be designed essentially independently of the transport media, regardless of whether the media is T1/E1, optical fiber, RF, etc. The PLL and FIFO combination adapts to the asynchronous nature of the transported data (in this case, audio data) after the transported data is removed from the transport media. Further, the inventive concepts described herein are not limited to transporting audio data, and may also be used to transport many other types of digital data known in the art.

A three page supplemental document entitled "Rate Adaptation" is attached. This document describes, at a relatively high level, the underlying concepts of the system 100 shown in FIG. 2.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system for adapting a transmission rate of an AES/EBU digital audio signal transmitted over a time division multiplexed communications link from a source to a destination, comprising:
   a first variable-depth storage component for receiving and temporarily storing the AES/EBU digital audio signal;
   a first processor for selectively withdrawing the AES/EBU digital audio signal from the first variable-depth storage component, for encapsulating the AES/EBU digital audio signal into packets compatible with the time division multiplexed communication link, and for transmitting the packets over the time division multiplexed communications link;
   a second processor for receiving the packets from the time division multiplexed communications link, for removing the AES/EBU digital audio signal from the encapsulating packets, and for depositing the AES/EBU digital audio signal into a second variable-depth storage component;
   wherein the first processor selectively withdraws the AES/EBU digital audio signal as a predetermined function of an amount of data in the first variable-depth storage component, and the second processor selectively withdraws the AES/EBU digital audio signal as a predetermined function of an amount of data in the second variable-depth storage component.

2. A system according to claim 1, wherein the first variable-depth storage component includes a FIFO.

3. A system according to claim 1, wherein the second variable-depth storage component includes a FIFO.

4. A system for adapting a transmission rate of an audio signal transmitted over a time division multiplexed communications link from a source to a destination comprising:
   a first variable-depth storage component for receiving and temporarily storing the audio signal;
   a first processor for selectively withdrawing the audio signal from the first variable-depth storage component, for encapsulating the audio signal into packets compatible with the time division multiplexed communication link, and for transmitting the packets over the time division multiplexed communications link;
   a second processor for receiving the packets from the time division multiplexed communications link, for removing the audio signal from the encapsulating packets, and for depositing the audio signal into a second variable-depth storage component;

wherein the first processor internally implements the first variable-depth storage component, and the second processor internally implements the second variable-depth storage component; and wherein the first processor selectively withdraws the audio signal as a predetermined function of an amount of data in the first variable-depth storage component, and the second processor selectively withdraws the audio signal as a predetermined function of an amount of data in the second variable-depth storage component.

5. A system according to claim 1, the second processor being clocked by a clocking signal derived from a signal source having a frequency which is variable according to a control signal from the second processor, wherein the second processor monitors the second variable-length storage component and adjusts the control signal so as to maintain the second variable-depth storage component approximately half full.

6. A system according to claim 5, wherein the signal source includes a PLL.

7. A system according to claim 5, further including a signal conditioner for receiving a signal from the signal source and producing a clocking signal therefrom.

8. A system according to claim 7, wherein the signal conditioner is implemented with a FPGA device.

9. A system according to claim 1, the first processor being clocked by a clocking signal derived from a signal source having a frequency which is variable according to a control signal derived from the time division multiplexed communications link.

10. A method of adapting a transmission rate of an AES/EBU digital audio signal transmitted over a time division multiplexed communications link from a source to a destination, comprising:
encapsulating the AES/EBU digital audio signal within the time division multiplexed communications link;
unpacking the AES/EBU digital audio signal from the encapsulation within the time division multiplexed communications link; and, varying the transmission rate of the AES/EBU digital audio signal at the destination, after unpacking from, the time division multiplexed communications link.

11. A method of adapting a transmission rate of an AES/EBU digital audio signal transmitted over a time division multiplexed communications link from a source to a destination, comprising:
receiving and temporarily storing the AES/EBU digital audio signal in a first variable-depth storage component;
selectively withdrawing the AES/EBU digital audio signal from the first variable-depth storage component as a predetermined function of an amount of data in the first variable-depth storage component, encapsulating the AES/EBU digital audio signal into packets compatible with the time division multiplexed communication link, and transmitting the packets over the time division multiplexed communications link;
receiving the packets from the time division multiplexed communications link, removing the AES/EBU digital audio signal from the encapsulating packets, and depositing the AES/EBU digital audio signal into a second variable-depth storage component, and selectively withdrawing the AES/EBU digital audio signal as a predetermined function of an amount of data in the second variable-depth storage component.

12. A method according to claim 11, further including implementing the first variable-depth storage component with a FIFO.

13. A method according to claim 11, further including implementing the second variable-depth storage component with a FIFO.

14. A method according to claim 11, further including implementing the first variable-depth storage component and the second variable-depth storage component in code, running on one or more processors.

15. A system for adapting a transmission rate of an AES/EBU digital audio signal transmitted over a time division multiplexed communications link from a source to a destination, comprising:
an encapsulator, including a first variable-depth storage component for receiving and temporarily storing the AES/EBU digital audio signal, wherein the encapsulator (i) selectively withdraws the AES/EBU digital audio signal from the first variable-depth storage component, (ii) encapsulates the AES/EBU digital audio signal into packets compatible with the time division multiplexed communication link, and (iii) transmits the packets over the time division multiplexed communications link; and,
an extractor for receiving the packets from the time division multiplexed communications link, for removing the AES/EBU digital audio signal from the encapsulating packets, and for depositing the AES/EBU digital audio signal into a second variable-depth storage component;
wherein the encapsulator selectively withdraws the AES/EBU digital audio signal as a predetermined function of an amount of data in the first variable-depth storage component, and the extractor selectively withdraws the AES/EBU digital audio signal as a predetermined function of an amount of data in the second variable-depth storage component.

16. A system according to claim 15, wherein the first variable-depth storage component and the second variable-depth storage component each include a FIFO.

17. A system for adapting a transmission rate of an AES/EBU digital audio signal transmitted over a time division multiplexed communications link from a source to a destination, comprising:
a first FIFO for receiving and temporarily storing the AES/EBU digital audio signal;
a first processor for selectively withdrawing the AES/EBU digital audio signal from the first FIFO, for encapsulating the AES/EBU digital audio signal into packets compatible with the time division multiplexed communication link, and for transmitting the packets over the time division multiplexed communications link;
a second processor for receiving the packets from the time division multiplexed communications link, for removing the AES/EBU digital audio signal from the encapsulating packets, and for depositing the AES/EBU digital audio signal into a second FIFO, the second processor being clocked by a clocking signal derived from a signal source having a frequency which is variable according to a control signal from the second processor, wherein the second processor monitors the second FIFO and adjusts the control signal so as to maintain the second FIFO approximately half full;
wherein the first processor selectively withdraws the AES/EBU digital audio signal as a predetermined function of an amount of data in the first FIFO, and the second processor selectively withdraws the AES/EBU digital audio signal as a predetermined function of an amount of data in the second FIFO.

18. A method of adapting a transmission rate of an AES/EBU digital audio signal transmitted over a time division multiplexed communications link from a source to a destination, comprising:

receiving and temporarily storing the AES/EBU digital audio signal in a first FIFO;

selectively withdrawing the AES/EBU digital audio signal from the first FIFO as a predetermined function of an amount of data in the first FIFO, encapsulating the AES/EBU digital audio signal into packets compatible with the time division multiplexed communication link, and transmitting the packets over the time division multiplexed communications link;

receiving the packets from the time division multiplexed communications link, removing the AES/EBU digital audio signal from the encapsulating packets, and depositing the AES/EBU digital audio signal into a second FIFO, and selectively withdrawing the AES/EBU digital audio signal as a predetermined function of an amount of data in the second FIFO.

* * * * *